Sept. 3, 1968  R. T. J. SKINNER  3,399,626

LIQUID DISPLACEMENT PUMPS

Filed Aug. 23, 1966

United States Patent Office 3,399,626
Patented Sept. 3, 1968

3,399,626
LIQUID DISPLACEMENT PUMPS
Robert Thomas John Skinner, Kenilworth, England, assignor to Joseph Lucas (Industries) Limited, Birmingham, England, a British company
Filed Aug. 23, 1966, Ser. No. 574,348
4 Claims. (Cl. 103—97)

ABSTRACT OF THE DISCLOSURE

A liquid displacement pump comprising a body having a cavity containing a rotor, an inlet and an outlet at angularly spaced positions around the rotor periphery, a part annular recess extending between the inlet and outlet, adjacent to the side of the rotor. The base of the recess is formed by a piston movable towards and away from the rotor. The piston has a passage extending through it and affording communication between the recess and the space in the body at the opposite end of the piston to vary the position of the piston.

---

This invention relates to liquid displacement pumps of the kind having a body, a bladed rotor mounted within a cavity in the body, an inlet and an outlet relatively spaced from one another, the outlet being adjacent to the rotor periphery and a part-annular recess defined in the wall of the cavity in the body, said recess extending around the periphery of the rotor at the side thereof between the position of the inlet and that of the outlet.

The object of the present invention is to provide a liquid displacement pump of the kind specified in a convenient form.

In accordance with the present invention a liquid displacement pump of the kind specified has the base of the part-annular recess formed by a piston movable towards and away from the rotor, said piston having a passage affording communication between the recess and a space in the body at the opposite end of the piston, the arrangement being such that in use, liquid will escape from the recess to said space and the pressure thereof will tend to move the piston towards the rotor to reduce the volume of the recess.

Figure 1:
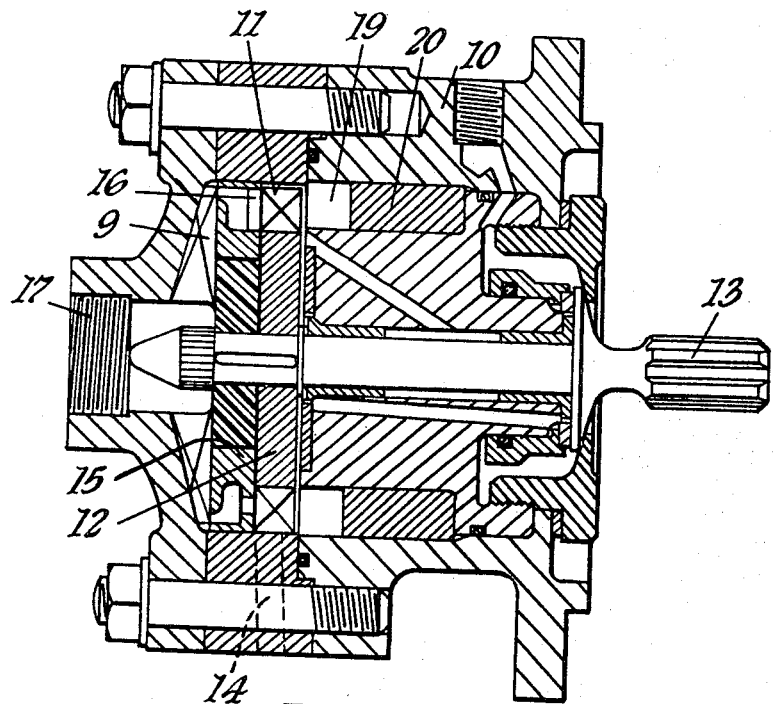
Figure 2:
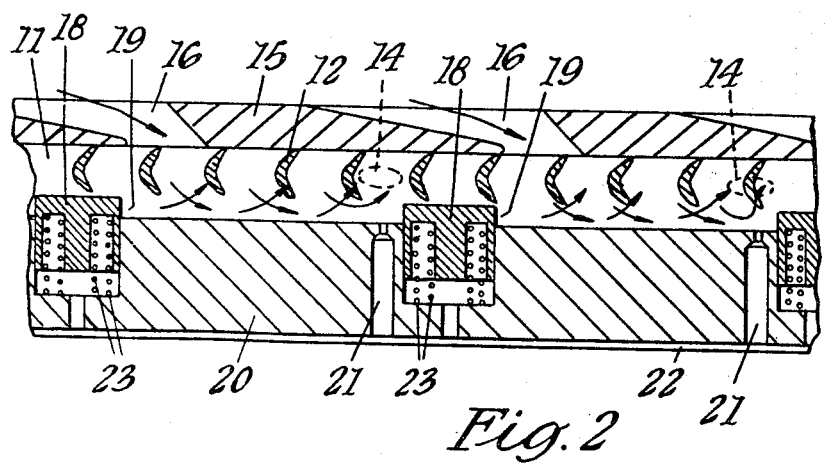

The invention will now be described by way of example with reference to the accompanying drawings in which:

FIGURE 1 is a cross-sectional view of a pump constructed in accordance with this invention and FIGURE 2 is a developed view around the recesses in the pump cavity illustrating the particular feature of the invention.

In the specific example illustrated there is provided a pump which is suitable for supplying liquid fuel to an internal combustion engine, such as a gas turbine engine. The pump has a body 10 which defines a generally cylindrical internal cavity within which is mounted a bladed rotor 12 connected to a shaft 13 which can be driven by the engine to which the pump is intended to supply fuel. The rotor blades are radial and can sweep the whole of the cavity 11, and in the cylindrical wall are a pair of diametrically opposite tangential outlets indicated at 14.

One side wall of the cavity comprises an inlet plate 15 having a pair of diametrically opposite inclined inlet openings 16 which communicate through a primary impeller 9 with an inlet port 17 formed centrally in a part of the pump body 10. These inlet openings 16 in the inlet plate 15 are at the rotor periphery and are angularly spaced from the outlets 14 respectively.

The opposite side wall of the cavity 11 is extended by an annular recess of channel shape in cross-section and this is divided by a pair of fixed abutments 18 into a pair of semicircular recesses 19, each of which extends between the position of one of the inlets 16 and that of one of the outlets 14, the outside edge of the recesses 19 being approximately in register with the cylindrical wall of the cavity 11 and the radial width of the recesses 19 being approximately a quarter of the radius of the rotor 12.

The base walls of the recesses 19 are formed by the crown of an annular piston 20 disposed in an annular chamber within the body, the piston 20 having two cavities in its crown for accommodation of the fixed abutments 18 respectively.

Near to the outlets 14, are a pair of restricted passages 21 respectively extending from the piston crown to a space 22 defined within the body 10 at the opposite end of the piston 20. In this example, the passages 21 terminate, in the crown of the piston, approximately mid-way between the inner and outer walls of the recesses 19 respectively.

Since in use, the pressure of liquid in each part annular recess 19 rises approximately linearly between the inlet 16 and the outlet 14, if the passage in the piston is disposed nearer to the outlet 14 than to the inlet 16, there will be a local pressure at this point in the recess, when a predetermined speed and thus a predetermined pressure is reached, which is greater than the average pressure exerted on the piston 20 between the inlet 16 and outlet 14. The total pressure on the piston crown tends to maintain the piston 20 at the extremity of its movement away from the rotor 12. The passages 21 however, permit the pressure at the point referred to, to reach the opposite side of the piston 20 and when this pressure exceeds the total pressure on the piston crown, the piston 20 will tend to move to close the recess 19 so that the pump will operate as a normal centrifugal pump. The piston 20 is however urged away from the rotor 12 by springs 23 acting between the abutments 18 and the piston 20, so that when the pump starts, the recesses 19 are defined and in this case, the force due to pressure tending to move the piston 20 towards the rotor 12 will have to be great enough also to overcome the spring force. This spring force will however be relatively small compared with the forces exerted by the liquid pressure.

Thus with this arrangement, the pump will begin to operate with the recesses 19 defined, though, if desired, there may only be one such recess provided, and when the pressure reaches the predetermined value, the pressure behind the piston 20 will be greater than the total forces acting upon it to urge it away from the rotor 12 so that it will tend to move towards the rotor to reduce the volume of the recesses 19. In order that the condition shall be maintained in which there are no recesses or a substantial reduction in the size of the recesses, as the case may be, it is desirable that the passages 21 shall terminate in the piston crown nearer to the outer circumferential edge of the piston 20 than to its inner edge. This is because in a centrifugal pump, there is a pressure gradient between the blades of the rotor increasing substantially radially outwardly, and it is believed that only beyond the mid-region of the piston will a sufficient pressure be available to maintain the position of the piston 20.

It is to be understood, however, that the position of the passages 21 in the piston crown can be varied to produce differing rates of movement of the piston 20 as may be required.

Having thus described my invention what I claim as new and desire to secure by Letters Patent is:

1. A liquid displacement pump comprising a body, a bladed rotor mounted within a cavity in the body, the body having an inlet and an outlet at positions relatively angularly spaced from one another, the inlet and the outlet being adjacent to the rotor periphery, a piston disposed within the body and movable towards and away from the rotor axially thereof and capable of defining, with the body, a part annular recess extending around the periphery of the rotor at the side thereof between the position of the inlet and that of the outlet, the piston having a passage affording communication between the recess and a space defined in the body between the piston and the body at the opposite end of the piston from the recess, to permit of access for liquid being pumped to said space to tend to move the piston towards said rotor.

2. A liquid displacement pump as claimed in claim 1 in which the passage is nearer to the outlet than the inlet.

3. A liquid displacement pump as claimed in claim 1 in which the passage is nearer to the outer circumferential edge of the piston than to its inner edge.

4. A liquid displacement pump comprising a body, a bladed rotor mounted within a cavity in the body, the body having a pair of inlets and a pair of outlets at positions angularly spaced from one another, the inlets and the outlets being adjacent to the rotor periphery, a piston disposed within the body and movable towards and away from the rotor axially thereof and capable of defining, with the body, a pair of part annular recesses extending around the periphery of the rotor at the side thereof between the positions of the inlets and outlets respectively, the piston having a pair of passages affording communication between the recesses and a space defined in the body between the piston and the body at the opposite end of the piston from the recesses, to permit of access of liquid being pumped to the space to tend to move the piston towards the rotor.

References Cited
UNITED STATES PATENTS

| 2,927,536 | 3/1960 | Rhoades | 103—97 |
| 2,957,424 | 10/1960 | Brundage | 103—97 |

ROBERT M. WALKER, *Primary Examiner.*